United States Patent
Zheng

(10) Patent No.: US 11,010,463 B2
(45) Date of Patent: May 18, 2021

(54) TERMINAL DEVICE PASSWORD UNLOCKING METHOD AND DEVICE, AND TERMINAL DEVICE USING THE SAME

(71) Applicants: Smart Electronic Industrial (Dong Guan) Co., Ltd., Dongguan (CN); Li Zheng, Dongguan (CN)

(72) Inventor: Li Zheng, Dongguan (CN)

(73) Assignees: Smart Electronic Industrial (Dong Guan) Co., Ltd.; Li Zheng

(*) Notice: Subject to any disclaimer, the term of this patent is extended or adjusted under 35 U.S.C. 154(b) by 276 days.

(21) Appl. No.: 16/308,584

(22) PCT Filed: Dec. 20, 2016

(86) PCT No.: PCT/CN2016/111017
§ 371 (c)(1),
(2) Date: Dec. 10, 2018

(87) PCT Pub. No.: WO2017/215225
PCT Pub. Date: Dec. 21, 2017

(65) Prior Publication Data
US 2019/0156012 A1   May 23, 2019

(30) Foreign Application Priority Data
Jun. 14, 2016 (CN) .......................... 201610423589.5

(51) Int. Cl.
*G06F 21/36* (2013.01)
*G06F 21/31* (2013.01)
(Continued)

(52) U.S. Cl.
CPC ............ *G06F 21/36* (2013.01); *G06F 3/0482* (2013.01); *G06F 3/04886* (2013.01); *G06F 21/31* (2013.01); *G06F 21/46* (2013.01)

(58) Field of Classification Search
CPC ........ G06F 21/36; G06F 21/31; G06F 3/0482; G06F 3/04886; G06F 21/46; G07C 9/00174; H04L 9/3226
See application file for complete search history.

(56) References Cited

U.S. PATENT DOCUMENTS

2013/0326611 A1* 12/2013 Gargi .................... G06F 21/31
726/16
2014/0136850 A1   5/2014 Jiang
(Continued)

FOREIGN PATENT DOCUMENTS

CN          101183941 A      5/2008
CN          103632075 A      3/2014
(Continued)

OTHER PUBLICATIONS

International Search Report for PCT/CN2016/111017 dated Mar. 22, 2017.

*Primary Examiner* — Carl G Colin
*Assistant Examiner* — Hany S. Gadalla
(74) *Attorney, Agent, or Firm* — Lerner, David, Littenberg, Krumholz & Mentlik, LLP

(57) ABSTRACT

A terminal device password unlocking method includes the following steps: selecting at least one candidate information set from a plurality of candidate information sets which are displayed on a screen and each of which contains a plurality of information units; verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password;

(Continued)

unlocking the terminal device when verification of password is successful.

6 Claims, 6 Drawing Sheets

(51) Int. Cl.
    *G06F 3/0482*    (2013.01)
    *G06F 3/0488*    (2013.01)
    *G06F 21/46*    (2013.01)

(56) References Cited

U.S. PATENT DOCUMENTS

| | | | |
|---|---|---|---|
| 2014/0245433 A1* | 8/2014 | Bao | G06F 21/36 726/19 |
| 2014/0344923 A1* | 11/2014 | Wang | G06F 21/36 726/19 |
| 2015/0172273 A1* | 6/2015 | Dong | G06F 21/00 726/7 |
| 2015/0178490 A1* | 6/2015 | Tamboly | G06F 21/46 726/4 |
| 2016/0026784 A1 | 1/2016 | Zheng | |
| 2016/0042171 A1* | 2/2016 | Murai | G06F 21/36 726/19 |
| 2016/0253488 A1 | 9/2016 | Zheng | |
| 2016/0259930 A1* | 9/2016 | Jerusalimsky | G06F 21/36 |

FOREIGN PATENT DOCUMENTS

| | | |
|---|---|---|
| CN | 104156655 A | 11/2014 |
| CN | 106096350 A | 11/2016 |

\* cited by examiner

TERMINAL DEVICE PASSWORD UNLOCKING METHOD AND DEVICE, AND TERMINAL DEVICE USING THE SAME

CROSS-REFERENCE TO RELATED APPLICATIONS

The present application is a national phase entry under 35 U.S.C § 371 of International Application No. PCT/CN2016/111017 filed Dec. 20, 2016, which claims priority from Chinese Application No. 201610423589.5 filed Jun. 14, 2016, all of which are hereby incorporated herein by reference.

FIELD OF THE INVENTION

The present invention relates to password security and more particularly, relates to a terminal device password unlocking method and device and a terminal device using the same.

BACKGROUND OF THE INVENTION

With popularity and development of terminal devices, they have found their application in kinds of aspects of people life such as working and daily life. Users have increased dependency upon these terminal devices. As a result, users get to realize security issues of terminal devices carrying much private user information.

In prior art, there are various unlocking methods for maintaining security of terminal devices including slide unlocking, password unlocking and nine-square stroking and the like. These methods also have kinds of applications. For example, slide unlocking can be used to unlock a locked mobile phone. Password unlocking can be used to get access for the user to specific software or unlock an electronic lock.

These unlocking means improve security of terminal devices. However, the user is required to input password characters sequentially and this causes inconvenience to the user. For instance, for unlocking a cell phone with a nine-square stroking technique, the user is needed to select desired squares based on the number of password characters due to only one digit being contained in a single square. In case the password contains more characters, the user must select corresponding number of squares, thus resulting in cumbersome inputting operation. Therefore, prior art password unlocking methods as described above are not convenient for the user.

SUMMARY OF THE INVENTION

The present invention provides a terminal device password unlocking method and device, and terminal device using the same to make unlocking simple and convenient for the user.

According to a first aspect of the invention, there is provided a terminal device password unlocking method. The method includes the following steps: selecting at least one candidate information set from a plurality of candidate information sets which are displayed on a screen and each of which contains a plurality of information units; verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password; unlocking the terminal device when verification of password is successful.

Preferably, the step of selecting at least one candidate information set from a plurality of candidate information sets which are displayed on the screen includes selecting at least one candidate information set from a plurality of candidate information sets which are displayed on the screen and obtaining selection sequence of the candidate information sets. Correspondingly, when verifying a password based on all of selected candidate information sets, success of password verification is confirmed in case that: each of selected candidate information sets contains at least one information unit of the password, the number of the selected candidate information sets is less than that of the information units of the password, and the information units contained in the selected candidate information sets are identical to corresponding information units of the password.

Preferably, all the information units of the candidate information set are displayed on the screen in a stationary manner.

Preferably, some information units of at least one candidate information set are displayed on the screen in a moving manner.

Preferably, only part of information units of the candidate information set are displayed in a predefined time, and all the information units of the candidate information set are repeatedly displayed.

Preferably, all the information units are displayed on the screen in a rotational manner around a center predefined in the screen.

Preferably, all the information units are displayed in the screen in a random moving manner.

Preferably, all the information units contained in a specific candidate information set are fixedly displayed when the candidate information set is selected.

Preferably, all the information units of each candidate information set are limited to be displayed in a special display region of the screen.

Preferably, the special display region is a circle, polygon or arc-shaped.

Preferably, the special displaying regions related to corresponding candidate information sets are distributed in a plurality of concentric circles, a circle, an array, or distributed in parallel manner.

Preferably, the candidate information sets are selected based on selection instructions of the user, and an instruction input source corresponding to the selection instructions, is provided by any one or more of the following components: microphone, gyro, physical button, touch screen, camera head, infra-red sensor and vibration sensor.

Preferably, the selection instructions are triggered by touching the candidate information sets on a touch screen by the user.

Preferably, said touching including sliding, tapping or pressing.

Preferably, the selection instructions are triggered by mapping a keyword of a voice message input by the user to corresponding candidate information set.

Preferably, the information units are any one or combination of the following information elements: character, color, font, font size, pattern or image.

Preferably, each of said information units contains two or more said information elements.

Preferably, each information unit is a character with color; and the character is displayed in said color in a displaying interface.

Preferably, the number of information units contained in some candidate information sets is different from that of other candidate information sets. Alternatively, the number of information unit contained in one candidate information set is different from that of the rest of candidate information sets.

Preferably, prior to the step of selecting at least one candidate information set from a plurality of candidate information sets, a further step is included: randomly arranging the information units of each candidate information set.

Preferably, the step of randomly arranging the information units of each candidate information set includes randomly setting the number of the information units of the candidate information set.

According to a second aspect of the invention, there is provided a terminal device password unlocking method. The method includes the following steps: displaying a plurality of candidate information sets on a screen, said each candidate information set containing a plurality of information units; obtaining a series of consecutive touching instructions from a user, and determining a plurality of candidate information sets selected through said series of consecutive touching instructions; verifying a password based on all of selected candidate information sets, and confirming success of password verification when: all information units contained in the password are included into the selected candidate information sets, and each of selected candidate information sets contains only one information unit of the password; unlocking the terminal device when verification of password is successful.

According to a third aspect of the invention, there is provided a terminal device password unlocking device. The device includes an obtaining module for selecting at least one candidate information set from a plurality of candidate information sets which are displayed on a screen and each of which contains a plurality of information units; a verification module for verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password; and a unlocking module for unlocking the terminal device when verification of password is successful.

Preferably, the obtaining module is for selecting at least one candidate information set from a plurality of candidate information sets which are displayed on the screen and obtaining selection sequence of the candidate information sets. Correspondingly, the verification module is for when verifying a password based on all of selected candidate information sets, success of password verification is confirmed in case that: each of selected candidate information sets contains at least one information unit of the password, the number of the selected candidate information sets is less than that of the information units of the password, and the information units contained in the selected candidate information sets are identical to corresponding information units of the password.

Preferably, all the information units of the candidate information set are displayed on the screen in a stationary manner.

Preferably, some information units of at least one candidate information set are displayed on the screen in a moving manner.

Preferably, only part of information units of the candidate information set are displayed in a predefined time, and all the information units of the candidate information set are repeatedly displayed.

Preferably, all the information units are displayed on the screen in a rotational manner around a center predefined in the screen.

Preferably, all the information units are displayed in the screen in a random moving manner.

Preferably, all the information units contained in a specific candidate information set are fixedly displayed when the candidate information set is selected.

Preferably, all the information units of each candidate information set are limited to be displayed in a special display region of the screen.

Preferably, the special display region is a circle, polygon or arc-shaped.

Preferably, the special displaying regions related to corresponding candidate information sets are distributed in a plurality of concentric circles, a circle, an array, or distributed in parallel manner.

Preferably, the candidate information sets are selected based on selection instructions of the user, and an instruction input source corresponding to the selection instructions, is provided by any one or more of the following components: microphone, gyro, physical button, touch screen, camera head, infra-red sensor and vibration sensor.

Preferably, the selection instructions are triggered by touching the candidate information sets on a touch screen by the user.

Preferably, said touching including sliding, tapping or pressing.

Preferably, the selection instructions are triggered by mapping a keyword of a voice message input by the user to corresponding candidate information set.

Preferably, the information units are any one or combination of the following information elements: character, color, font, font size, pattern or image.

Preferably, each of said information units contains two or more said information elements.

Preferably, each information unit is a character with color; and the character is displayed in said color in a displaying interface.

Preferably, the number of information units contained in some candidate information sets is different from that of other candidate information sets. Alternatively, the number of information unit contained in one candidate information set is different from that of the rest of candidate information sets.

Preferably, a setting module is further included for randomly arranging the information units of each candidate information set.

Preferably, the setting module is for randomly setting the number of the information units of the candidate information set.

According to a fourth aspect of the invention, there is provided a terminal device password unlocking device. The device includes an information displaying module for displaying a plurality of candidate information sets on a screen, said each candidate information set containing a plurality of information units; an instruction obtaining module for obtaining a series of consecutive touching instructions from a user, and determining a plurality of candidate information sets selected through said series of consecutive touching instructions; a password verification module for verifying a password based on all of selected candidate information sets, and confirming success of password verification when:

all information units contained in the password are included into the selected candidate information sets, and each of selected candidate information sets contains only one information unit of the password; and a terminal device unlocking module for unlocking the terminal device when verification of password is successful.

According to a fifth aspect of the invention, there is provided a terminal device for performing a terminal device password unlocking method as described above. The terminal device includes a storage module, a display and a control module for performing the aforementioned method.

Compared to prior art technology, the terminal device password unlocking method and device and a terminal device using the same of the invention feature the following aspects: selecting at least one candidate information set from a plurality of candidate information sets which are displayed on a screen and each of which contains a plurality of information units; verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password; unlocking the terminal device when verification of password is successful. Each candidate information set contains a plurality of information units, and one candidate information set may contain two or more information units of a password. The number of the selected candidate information sets is less than that of the information units of the password. Therefore, the user can select a plurality of candidate information sets of which the number is less than that of the information units of the password. In addition, there is no need for the user to consider arrangement sequence of the information units of the password. Accordingly, user operation is simplified and convenience is improved.

The additional aspects and advantages of the invention will be set forth in part in the description, which follows.

BRIEF DESCRIPTION OF THE DRAWINGS

The above and/or additional aspects and advantages of the present invention will become apparent and readily understood from the drawings, in which.

DETAILED DESCRIPTION OF THE INVENTION

Figure 1:
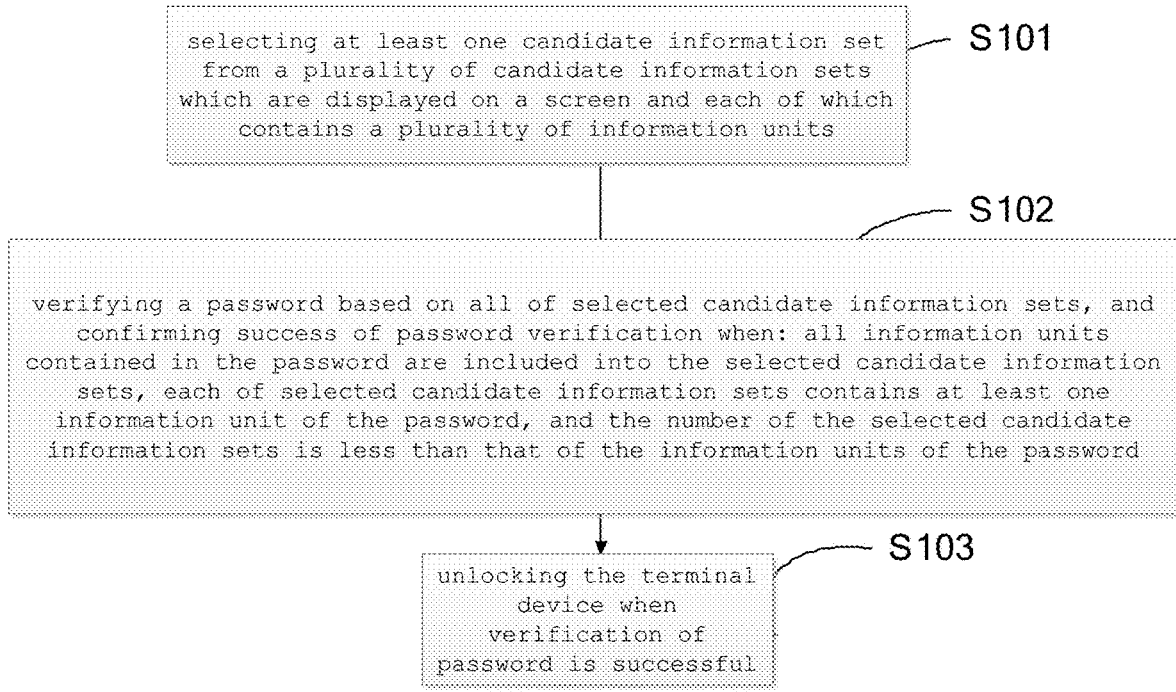
FIG. 1 shows a flow chart of a terminal device password unlocking method according to an embodiment of the invention.

Various embodiments of the invention are described below in details. The examples of these embodiments are illustrated in figure drawings. Throughout the drawings, same or similar numerals are used to refer to same or similar elements or those having same or similar function. The description of the embodiments in conjunction with drawings is only exemplary for explaining principle of the invention and is not to be interpreted to limit the invention.

It should be understood by person of the ordinary skill in the art that unless otherwise specified, terms "a", "one", "the" and "said" in singular form may also be used in plural form. It should be further understood that the term "include" as used herein means presence of said feature, integer, step, operation, element and/or component, but not excluding presence of one or more additional other feature, integer, step, operation, element and/or component and/or their combination. The term "and/or" includes one or more related elements and all combination thereof.

It should be understood by person of the ordinary skill in the art that unless otherwise specified, all the terminology (including technical and scientific terms) have their ordinary meaning as understood by person of the art.

It should also be understood by person of the ordinary skill in the art that the device, terminal, or terminal device of the invention may include device of a wireless signal receiver capable of only receiving signal while not be able to transmitting signals. It may also include device capable of receiving and transmitting signals. Examples include cellular device or other communication device, cellular device or other communication device with single line or multiple-line display or without multiple-line display, PCS (Personal Communications Service with the ability of processing voice, data, fax and/or data communication; PDA (Personal Digital Assistant) including radio frequency receiver, pager, internet/intranet access, network explorer, notepad, calendar and/or GPS (Global Positioning System) receiver; and normal alp-top and/or palmtop computer or other device including radio frequency receiver. The terminal and terminal device may be portable, transportable, or installable to vehicle (aviation, shipping and/or land), or is configured to be operated in local position, and/or distributed location, or be operated on earth and/or any other location on space. The device, terminal and terminal device may also include communication terminal, internet access terminal, music/video play terminal such as PDA and/or mobile phone, or smart TV, top box and the like.

The "information unit" as used herein has its ordinary meaning of a unit composed of at least one information element. The information element may include any one or combination of character, color, font, font size, image, pattern or even sound wave. An information unit may be constructed of a character to get visual expression. It may also be the combination of character and color to also get the visual expression. Alternatively, it may be the combination of pattern and color. It is known from above explanation that the information unit may not be limited to any one or combination of character, color, font, font size, image, and pattern. The character has ordinary and customary meaning and may include but not limited to Chinese characters, English characters, Arab numbers, Roman numbers and the like. Publicly, information may be expressed by kinds of manners. Each kind of information should be expressed by some manner. The information may be sorted into visual information and non-visual information. The information unit and candidate information unit as described in present invention are preferably visual expression information. They may also be non-visual information.

Unless otherwise specified, the terms "password" or "predefined password" as used throughout the specification means the password preset by the user and it generally is composed of several information units arranged according certain sequence, for example a string of characters or characters with color and it normally is stored implicitly. As such, the term "verifying or verification" occurred herein is not necessarily only pointed to direct comparison of contents corresponding to the password, expressed according to certain manner and stored, with the contents selected by the user. It may also mean comparison of the password after transformation with the contents selected by the user. In other words, the correct information unit may have kinds of forms such as explicit expression, implicit expression and other intermediate expression. The inventor of the invention believes that person of the art would understand the true meaning of above concepts.

FIG. 1 shows a flow chart of a terminal device password unlocking method according to an embodiment of the invention.

A terminal device password unlocking method is used for a terminal device with a screen which provides a displaying interface for realizing interaction with a user in order that the user is able to input password, and as shown in FIG. 1, the method includes a step S101 of selecting at least one candidate information set from a plurality of candidate information sets which are displayed on a screen and each of which contains a plurality of information units.

A plurality of candidate information sets is displayed in advance on the screen of the terminal device. Each candidate information set contains a plurality of information units. The information units of each candidate information set is also displayed on the screen. Each candidate information set has a predefined display region upon which the use can act to trigger selection of the candidate information set. Selection of the candidate information set represents selection of all the information units contained in the same candidate information set.

Single candidate information set can contain a larger or smaller number of information units than the information units contained in the password. Accordingly, candidate information set can contain some information units of the password or contain no information units of the password. However, all the information units of the password should be contained in a collection of all information units of the all candidate information sets so that the terminal device can be unlocked when correct candidate information sets are selected. If not all of the information units of the password is contained in a collection of all information units of the all candidate information sets, the terminal device will not be able to be unlocked no matter which candidate information set is selected.

When a candidate information set on a touch screen is selected by the user, the selected candidate information set is then obtained by the terminal device. The user may select one or more candidate information sets. As a result, the selected candidate information sets may be part or all of the candidate information sets on the screen.

the method also includes a step S102 of verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password.

When the candidate information sets are selected, they are verified to determine whether all information units contained in the password are included into the selected candidate information sets, whether each of selected candidate information sets contains at least one information unit of the password, and whether the number of the selected candidate information sets is less than that of the information units of the password. To better explain it, the above three conditions are referred as to a first condition, a second condition and a third condition. The password verification is successful if all of the three conditions are met. Otherwise, it means failure of password verification.

Specifically, as the password and candidate information sets are both consisted of a plurality of information units, determination can be made whether a common information unit is shared by selected candidate information set and the password. If a common information unit is shared between the candidate information set and password, then it is confirmed that the candidate information set contains an information unit of the password. A new set may be defined by all of the selected candidate information sets and comparison can be made between the new set and the password to know whether each of the candidate information sets contains a particular one of the information units of the password. If yes, it is then confirmed that all the information units of the password are covered by the selected candidate information sets. In case that above two conditions are satisfied, and the number of the selected candidate information sets is less than that of the information units of the password, then it means successful password verification.

In an example, 6 candidate information sets are shown on the screen. They are candidate information sets A (1,3,6), B (2,6,7), C (8,6,0), D (9,3,2), E (5,8,0), and F (4,3,9) respectively, and the password is 1578 (4 information units). If the user selects candidate information sets A, B, C, and D, password verification will fail because the candidate information set D doesn't contain any information unit of the password. If the user selects candidate information sets A, B, and C all of which contain a corresponding information unit of the password, password verification will still fail, because information unit "5" of the password is not covered by any one of the candidate information sets A, B, and C. only one the user selects the candidate information sets A, B, and E, verification of password can be successful.

In an example, 4 candidate information sets are shown on the screen. They are candidate information sets A (1,3,4), B (2,6,7), C (8,6,0), and D (9,3,2) respectively, and the password is 2667. Password verification will be successful if the user only selects the candidate information set B, or selects B and D, or just selects B and C.

As such, as each candidate information set contains a number of information units, and each candidate information set can contain two or more information units of the password, the user is able to select less number of candidate information sets than the number of the information units of the password. Moreover, there is no need for the user to consider arrangement sequence of the information units of the passwords. Therefore, user operation for verifying the password is simplified, and convenience is realized. Furthermore, various kinds of selections can be made to the candidate information sets to realize successful password verification. This can cause confusion to other person who wants to crack the password, and accordingly, security of the password is enhanced.

The method also includes a step S103 of unlocking the terminal device when verification of password is successful.

When verification of password is successful, the terminal device will be unlocked and when verification fails, the terminal device will maintain its locked status.

In an embodiment, the step S101 of selecting at least one candidate information set includes selecting at least one candidate information set from a plurality of candidate information sets which are displayed on the screen and obtaining selection sequence of the candidate information sets. Correspondingly, when verifying a password based on all of selected candidate information sets, success of password verification is confirmed in case that: each of selected candidate information sets contains at least one information unit of the password, the number of the selected candidate information sets is less than that of the information units of the password, and the information units contained in the selected candidate information sets are identical to corresponding information units of the password.

The candidate information sets are arranged according to the sequence they are selected.

When password verification is performed based on the selected candidate information sets, determination is made of whether each candidate information set and the password share one or more common information units, and whether the number of the selected candidate information sets is less than that of the information units of the password. If common information units are shared by them and the number of the selected candidate information sets is less than that of the information units of the password, then the information units shared by the selected candidate information sets and the password are selected and arranged in sequence the candidate information sets are selected. It is then determined whether such arranged information units are the same to the password. If yes, then it represents successful password verification.

In particular, following order of the information units presented in the password and selection order of the candidate information sets, comparison is made between a first password information unit and firstly selected candidate information set to know whether the first password information unit is contained in the firstly selected candidate information set. If no, no further comparison will be done. If yes, comparison is made between a second password information unit and the firstly selected candidate information set know whether the second password information unit is contained in it. If no, then comparison is made between the second password information unit and a secondly selected candidate information set know whether the second password information unit is contained in it. If no, no further comparison will be done, and if yes, further comparisons will be done until comparison is made between the last password information unit and last selected candidate information set.

It is determined whether comparison is interrupted and if yes, then it means password verification failure. If no, it means successful verification.

In an example, 6 candidate information sets are shown on the screen. They are candidate information sets A (1,3,6), B (2,5,7), C (4,6,0), D (9,3,2), E (5,8,0), and F (4,3,9) respectively, and the password is 1578. When the user selects the candidate information sets A, E, and B respectively, it is clear that the selected candidate information sets contain some password information units totally, and the number of the selected candidate information sets is less than that of the information units of the password. When putting the password information units contained in the candidate information sets together, i.e., picking up 1 from the candidate information set A, 5 from the candidate information set B, and 7 from the candidate information set B, there will be a string of number 157 different from 1578 (password) and accordingly, password verification will fail. Instead, when the user selects the candidate information sets A, B, and E respectively, 1 is picked up from the candidate information set A, 5 and 7 are picked up from the candidate information set B, and 8 is picked up from the candidate information set E. there will be a string of number 1578 identical to 1578 (password) and accordingly, password verification will be successful.

Therefore, the instant embodiment considers correspondence between the arrangement order of the information units in the password and the order the candidate information sets are selected. It is required that each selected candidate information set contains at least one information unit of the password and the number of the selected candidate information sets is less than that of the information units of the password. It is also required that the password information units contained in the selected candidate information sets occur in the same sequence the same password information units are arranged in the password. Accordingly, user operation is simplified and security is improved.

In an embodiment, all the information units of the candidate information set are displayed on the screen in a stationary manner. Displaying on the screen in a stationary manner means that the displaying locations of the information units are unchanged relative to the candidate information set to which they belong, or unchanged relative to the entirety of all the candidate information sets. It doesn't mean that the location of an information unit is fixed to a predefined position of the screen. When the user adjusts displaying locations of all the candidate information sets, the location of an information unit on the screen is changed, but unchanged relative to the candidate information set to which it belongs.

Of course, the information unit can be configured so that its shape, size or color is kept unchanged.

In an embodiment, some information units of at least one candidate information set are displayed on the screen in a moving manner. It means some or all information units of one candidate information set are displayed on the screen in a moving manner, or some or all information units of all the candidate information set are displayed on the screen in a moving manner.

Displaying on the screen in a moving manner means the locations of the information units on the screen are changed real time or periodically so as to realize dynamically visualized display effect. For example, they can be displayed on the screen in a rolling manner, rotation manner, or jumping manner.

Therefore, displaying of the information units on the screen in a moving manner will enhance concealment and obscurity of the password.

Various embodiments of displaying on the screen in a moving manner will be described below.

Figure 2A:
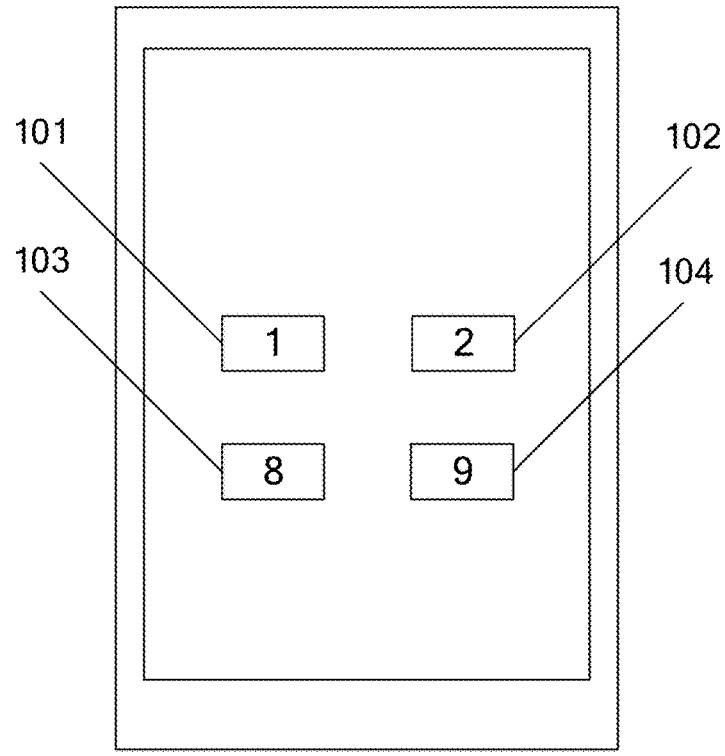
FIGS. 2A-2B show several schematic views of a displaying interface in which information units are dynamically displayed according to an embodiment of the invention.
Figure 2B:
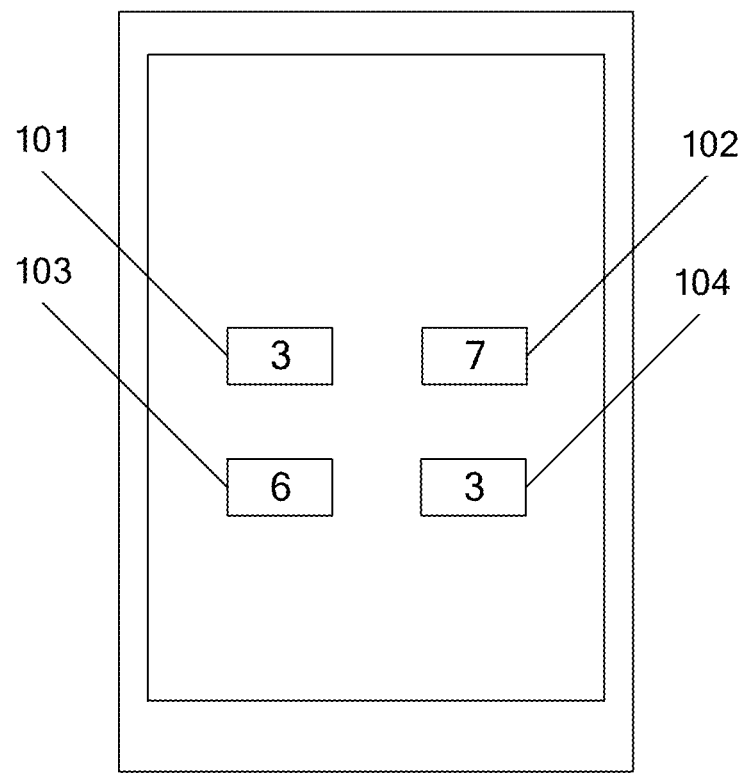

In an embodiment and as shown in FIGS. 2A and 2B, 4 candidate information sets are shown on the screen, each having two information units. Here, a first candidate information set 101 contains 1 and 3, a second candidate information set 102 contains 2 and 7, a third candidate information set 103 contains 8 and 6, and a fourth candidate information set 104 contains 9 and 3.

As shown in FIG. 2A, at a moment, only 1, 2, 8 and 9 are shown in the first, second, third and fourth candidate information sets 101, 102, 103 and 104 respectively.

As shown in FIG. 2B, after a period of time, 3, 7, 6 and 3 are shown in the first, second, third and fourth candidate information sets 101, 102, 103 and 104 respectively. They are different from those shown in FIG. 2A. After a further period of time, the information units of FIG. 2A will be shown again, thus realizing repeated displaying effect of the information units.

In case three or more information units are contained in a candidate information set, two or more of the information units may be displayed in a predefined time which can be determined based on demand of the user.

Figure 3A:
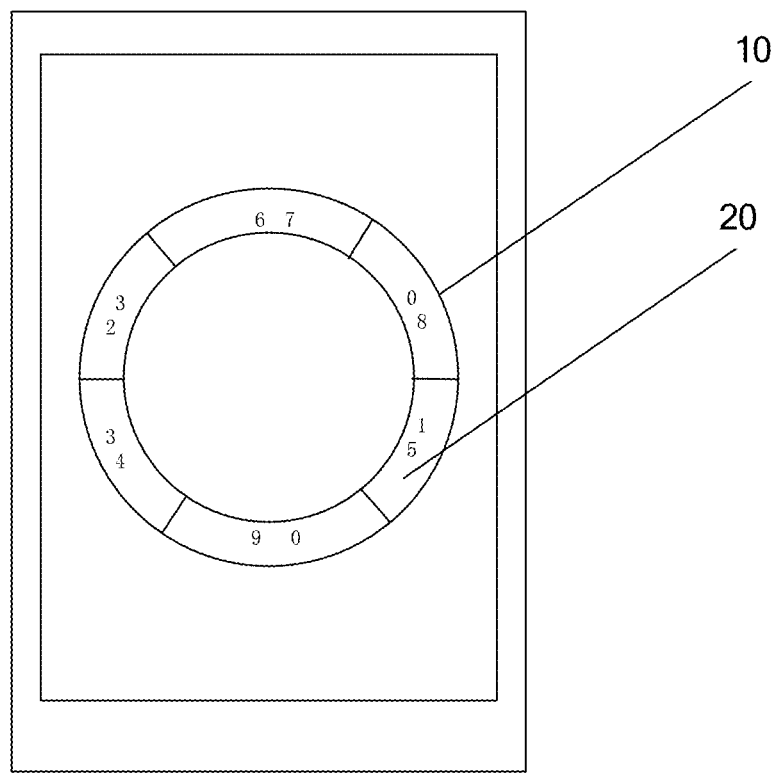
FIGS. 3A-3B show several schematic views of a displaying interface in which information units are dynamically displayed according to an embodiment of the invention.
Figure 3B:
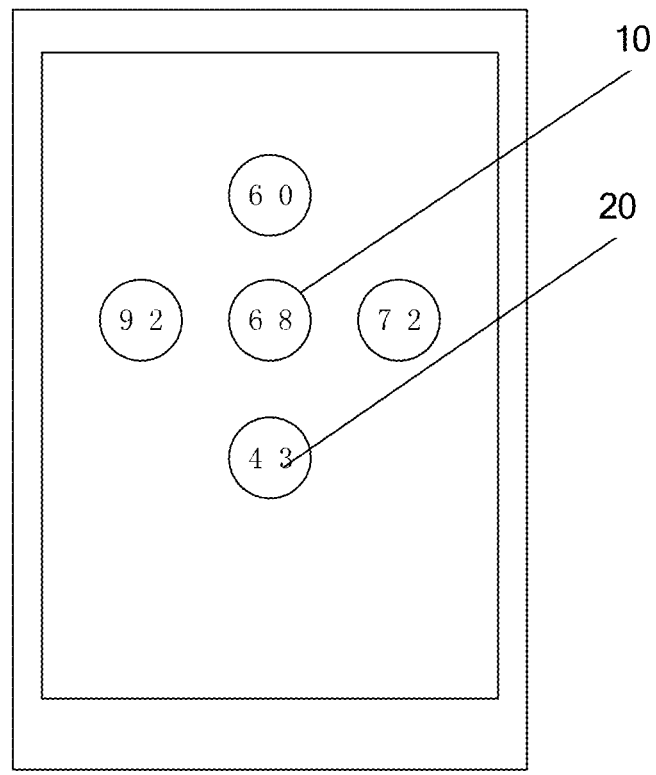

In an embodiment, as shown in FIGS. 3A and 3B, an information unit 20 is displayed on the screen in a rotational manner around a center predefined in the screen. Specifically, a candidate information set 10 is displayed on the screen in a rotational manner around the center predefined in the screen.

As shown in FIG. 3A, there are 6 candidate information sets 10 on the screen, and they are arranged on a circle with a center at a predefined location of the screen and rotate around the predefined location.

As shown in FIG. 3B, there are 5 candidate information sets 10 on the screen; a first candidate information set is displayed at a predefined fixed position of the screen, while the rest 4 candidate information sets surround and rotate around the first candidate information set.

Of course, more candidate information sets can have fixed locations while others rotate around the sets with fixed locations. It is noted that for better identification by the user, reasonable rotation speed should be defined. Also, corresponding setting should be provided in the terminal device such that the user is able to set proper rotation speed or direction.

In an embodiment, all the information units of one candidate information set are moving in the same candidate information set. At the same time, color and size of the above information units are also randomly changing. In case the information units are composed of digits, letters or words, the fonts of the digits, letters or words may be changed randomly.

In above embodiment, displaying of the information units on the screen in a moving manner will enhance concealment and obscurity of the password. However, to certain extent, it is also hard for the user to identify and select candidate information sets. Accordingly, in this embodiment, once the candidate information sets are selected, they are displayed with their locations unchanged.

In particular, it is detected whether the candidate information sets have been selected in real time. If yes, the information units are displayed on the screen with their locations kept unchanged. For example, when an interface is in a locked mode, the terminal device will detect real time whether its touch screen has been touched. If yes, the information units are displayed on the screen with their locations kept unchanged. In case touching of the screen has been terminated in a predefined time, the information units are changed to be displayed in a moving manner from a fixed manner.

Therefore, this embodiment enhances concealment and obscurity of the password, and also facilitates identification and selection of the information units by the user, thus improving user experience.

Based upon a previous embodiment, in current embodiment, all the information units of e candidate information set are limited to be displayed in a special display region of the screen. Selection of this special display region will trigger selection of a candidate information set associated with the special display region. The special display region has its special display boundary which can be disappeared from the screen. Or, to be identified by the user, this boundary can be configured to be displayed on the screen, for example displayed as some special boundary lines.

Here, the special display region may have but not are not limited to the shape of circle, polygon and arc. Also, the information units can be distributed in the special display region along a line, in parallel, along a triangle or other shape. The special display regions of a plurality of candidate information sets can distributed in the form of concentric circles, a circle, and an array, in parallel or in other shape. The shape of the special display regions, arrangement of the information units in a candidate information set together with the shape of the special display region of a particular set can be combined freely.

Of course, to bring better visual experience to the user and bring easy identification and selection of the candidate information sets to the user, the shape of the special display regions, and arrangement of the information units in candidate information set should be optimized. For instance, when the special display regions of the candidate information sets are arranged in an array, the special display regions may be of a circle. When the special display regions are rectangular, the information units can be arranged in the special display region as a line, and the special display regions of the candidate information sets can be arranged in parallel.

Figure 4A:
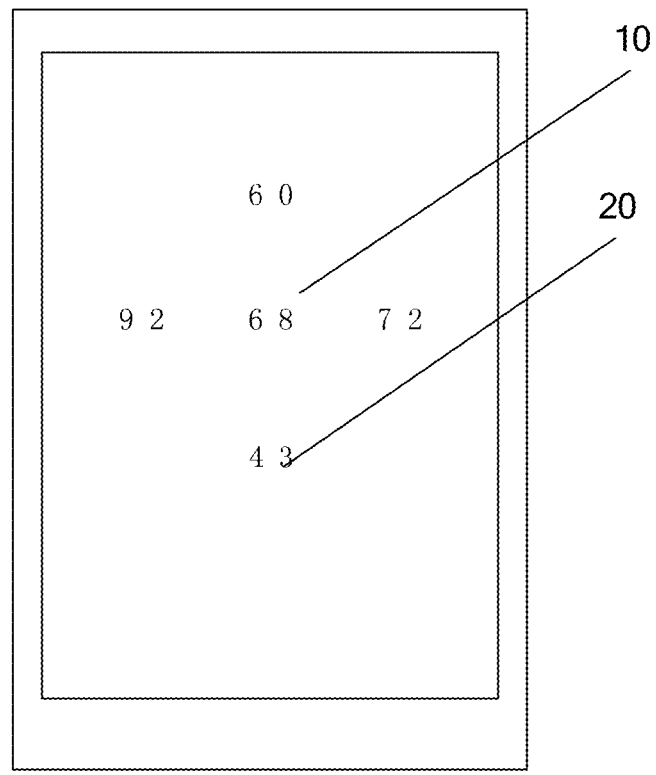
FIGS. 4A-4C show several schematic views of a displaying interface in which information units are dynamically displayed according to various embodiments of the invention.
Figure 4B:
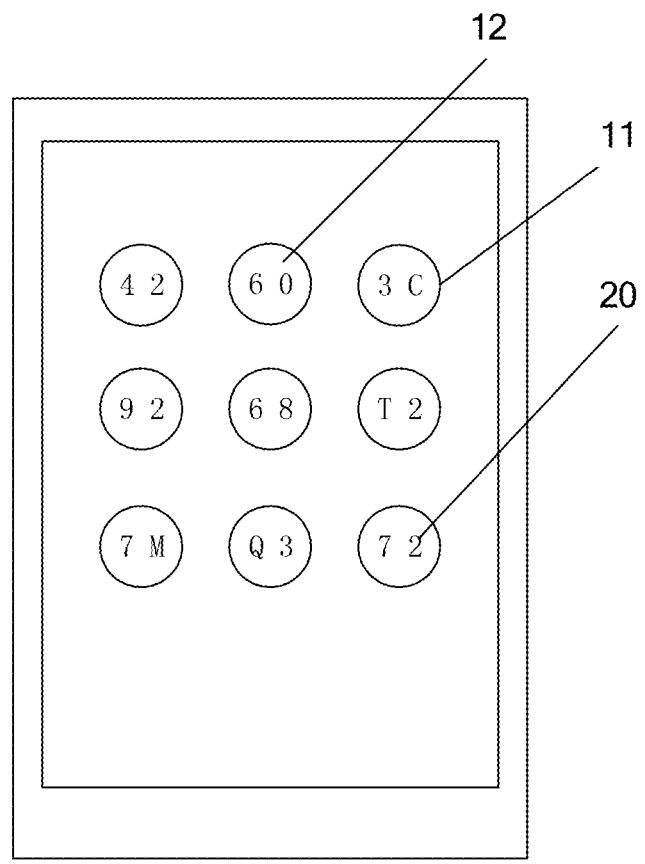
Figure 4C:
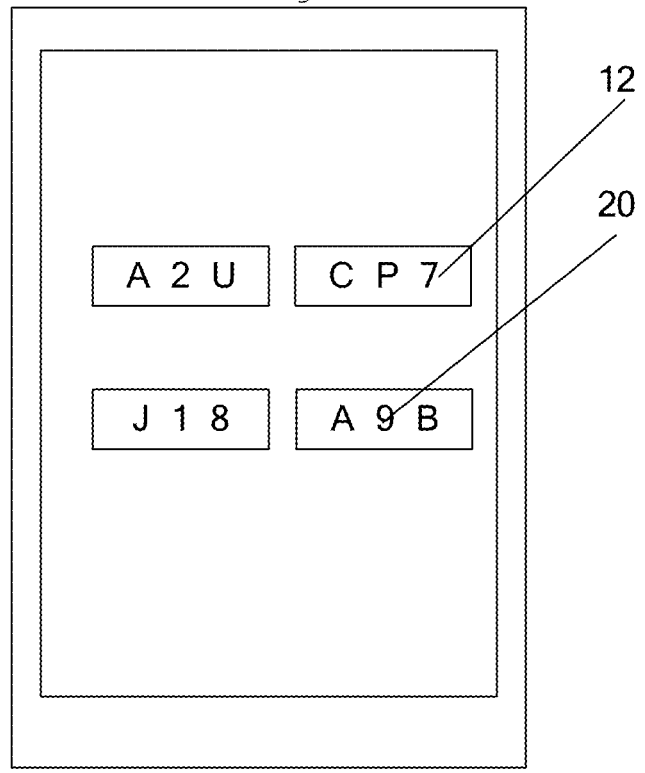

FIGS. 4A-4C show some related examples.

In FIG. 4A no special display boundary is shown. 2 information units are close to each other and form together a candidate information set to be selected by the user.

In FIG. 4B each special display boundary 11 is a circle and defines a circular special display region 12. In addition, the special display regions 12 of the candidate information sets are arranged in an array.

In FIG. 4C each special display region 12 is a rectangular and all the information units 20 contained in a region 12 are distributed in a line. The special display regions 12 of the candidate information sets are parallel with each other.

In an embodiment, the candidate information sets are selected based on selection instructions of the user, and an instruction input source corresponding to the selection instructions, is provided by any one or more of the following components: microphone, gyro, physical button, touch screen, camera head, infra-red sensor and vibration sensor.

In an embodiment, the selection instructions are triggered by touching the candidate information sets on a touch screen by the user. For example, the user can tap, stroke and press the candidate information set on the touch screen. The touch screen detects in real time whether touch occurs on its surface and if yes, and touch occurs in a display range of the candidate information set, the same set is selected.

In an embodiment, the terminal device is equipped with a microphone through which voice messages of the user is obtained by the terminal device and the input voice messages are handled to retrieve a keyword. If this keyword is corresponding to a predefined correlation word associated with a particular candidate information set, then the same set is selected. To be more convenient, the correlation word is unique and a plurality of correlation words should be arranged in a certain sequence. For example, the candidate information sets can be arranged in a line on the screen, and each candidate information set is assigned a sequence number as its correlation word. If the voice message of the user contains the sequence number, then a corresponding candidate information set is selected accordingly. The terminal device can also provide corresponding options for the user to set correlation words of the candidate information sets.

Of course, the selection instructions may also be triggered by other means. For example, a camera can be used to detect a particular gesture or eyeball movement of the user, a gyro can be used to detect an operation of the user upon the terminal device, a vibration sensor can be used to detect movement of the terminal device caused by the user, an infra-red sensor can be used to detect a special gesture of the user, and one or more physical buttons can be checked to know whether they are in a conductive state.

In an embodiment, the information units are any one or combination of the following information elements: character, color, font, font size, pattern or image. By the same token, the information units of the password are also any one or combination of the following information elements: character, color, font, font size, pattern or image. Here, the character may be word, digit, letter or sign. The color may be red or black or other color. The font may be of commonly used font types. The pattern may be a triangle, circle or polygon. It is noted that to be better identified by the user, the candidate information sets should be configured such that they will be distinguished easily by the user. For example, when color is taken as the information element and when an information unit is pink, it is improper to make other information units in light red or cardinal. Instead, they should be made in green or black.

In case the information unit is consisted of only one kind of information element, the same kind of information elements constitute the information unit. Comparison is made between an information element of an information unit of the password and information element of each information unit of the candidate information set to know whether the selected candidate information set contains at least one information unit of the password. It is confirmed that the selected candidate information set contains at least one information unit of the password if they share at least one common information element. Similarly, when determining whether all the information units of the password are covered by all the selected candidate information sets totally, comparison is made between an information element of each information unit of the password and an information element of each information unit of each selected candidate information set. It is confirmed that the selected candidate information sets contains all the information units of the password if they share common information elements totally.

To further enhance security and concealment, each information unit may be made of two or more kinds of information elements. When verifying whether the information units of a selected candidate information set are identical to those of the password, verification should be done on information element basis. Moreover, only when all the information elements of an information unit of the candidate information set are identical to those of a corresponding information unit of the password, it means successful verification.

Colored information units will be taken as an example as colored characters will be distinguished easily by the user. For example, an information unit of the password is 1 in red, while a candidate information set contains a red 2, a black 1 and a red 1. Red 2 and black 1 are both different from red 1 of the password, but red 1 of the candidate information set is identical to red 1 of the password. Of course, the information unit may also be constructed of combination of color, pattern, character and font. For instance, an information unit may be black C, or blue Chinese character "王".

In an embodiment, the number of information units contained in some candidate information sets is different from that of other candidate information sets. Alternatively, the number of information unit contained in one candidate information set is different from that of the rest of candidate information sets. For instance, there are 4 candidate information sets shown on the screen. Two of them each contain 3 information units, while the rest two sets contain 1 and 2 information units respectively. Inclusion of different number of information units in different set will improve obscurity and security.

Further, the number of the information units contained in respective candidate information sets may be designed following a certain rule. For example there are 4 candidate information sets shown on the screen. They contain 1, 2, 3 and 4 information units respectively. From the perspective of a person, regular setting of the number of the information units may mislead the person to understand that this is relevant to the password, thereby making wrong thinking. This further enhances obscurity and security.

In an embodiment, prior to the step 101 of selecting at least one candidate information set from a plurality of candidate information sets which are displayed on a screen, a further step of randomly arranging the information units of each candidate information set is included.

After the information units of each candidate information set are arranged randomly, the information units displayed each time on the screen are random. Consequently, the information units displayed on the screen at a previous time may be different from those displayed on the screen at a next time, thus it being very hard for others to crack the password from the changing information units, and concealment and security of the password is improved accordingly. It is noted that this random arrangement should make sure that the information units of the randomly arranged candidate information sets should contain information units of the password so that the user is able to select correct candidate information sets and perform password verification. Otherwise, possibly the terminal device would not be able to be unlocked. Also, this random arrangement is done after previous password verification (unlocking the terminal device) and before displaying the locked screen. During unlocking, if the wrong candidate information set has been chosen by the user, the entire password verification will fail and the information units of the candidate information sets will not be randomly arranged. This random arrangement of the information units is done only after successful verification.

In particular, random arrangement of information units means random arrangement of the information elements of the units. What can be changed are information element itself, and increase and/or decrease of type of element.

In an embodiment, information elements themselves other than type of them can be changed. In another embodiment, the information units may be characters with color. For example, there are 3 candidate information sets on the screen, a first candidate information set contains a black 1 and red 2, a second candidate information set contains a blue 5 and green 3, while a third candidate information set contains a black 7 and purple 4. After successful password verification, next time these candidate information sets can be such configured that the first candidate information set contains a black 8 and red 2, the second candidate information set contains a red 5 and green 3, and the third candidate information set still contains a black 7 and purple 4. Clearly, characters of information units of the first candidate information set have been changed, and color of the information units of the second candidate information set have been changed. The above information units are still consisted of information elements (color and characters), while type of the information elements maintains unchanged.

In an embodiment, different information elements can be added. In an embodiment, the information units are characters with color. For example, there are 3 candidate information sets on the screen, a first candidate information set contains a black A and red B, a second candidate information set contains a blue C and green While a third candidate information set contains a black E and purple K. After successful password verification, next time these candidate information sets can be such configured that the first candidate information set contains a black triangle and red B, the second candidate information set contains a blue C and green F, and the third candidate information set contains a black E and purple five-pointed star. Clearly, in addition to color and character working as information elements, the first and third candidate information sets also contain a new information element: pattern.

In an embodiment, the types of the information elements can be reduced. In particular, the types of the information elements in single candidate information set can be reduced. In an embodiment, information elements are characters with color. For example, there are 3 candidate information sets on the screen, a first candidate information set contains a black triangle and red B, a second candidate information set contains a blue C and green F, While a third candidate information set contains a black E and purple five-pointed star. After successful password verification, next time these candidate information sets can be such configured that the first candidate information set contains a black A and red B, the second candidate information set contains a blue C and green F, and the third candidate information set contains a black E and purple K. Apparently the number of pattern-type information elements of the information units is decreased.

In an embodiment, the step of randomly arranging the information units of a candidate information set includes randomly setting the number of the information units of the candidate information set. Specifically, the number of the information units of the candidate information set can be increased or decreased. For example, there are 3 candidate information sets on the screen, a first candidate information set contains 3 information units, a second candidate information set contains 2 information units, While a third candidate information set contains 4 information units. After successful password verification, next time these candidate information sets can be such configured that the first candidate information set contains 5 information units, the second candidate information set contains 3 information units, and the third candidate information set contains 2 information units.

In an embodiment, prior to the step 101 of selecting at least one candidate information set from a plurality of candidate information sets which are displayed on a screen, a further step of randomly setting the number of the candidate information sets is included. After the number of the candidate information sets is randomly defined, each time the number of the candidate information sets displayed on the screen is random. Therefore, the number of the candidate information sets shown on the locked screen at a previous time may be different from that of a next time, thus enhancing concealment and security. Of course, It is noted that this random arrangement should make sure that the information units of the randomly arranged candidate information sets should contain information units of the password so that the user is able to select correct candidate information sets and perform password verification.

Various embodiments described above are only exemplary of the current invention. Any one or more of the number of the information units, that of the information elements of the unit, and that of the candidate information sets can be combined randomly. Also, the terminal device can also provide corresponding options for the user to combine one or more of the number of the information units, the number of the information elements of the unit and that of the candidate information sets according to his requirement.

Figure 5:
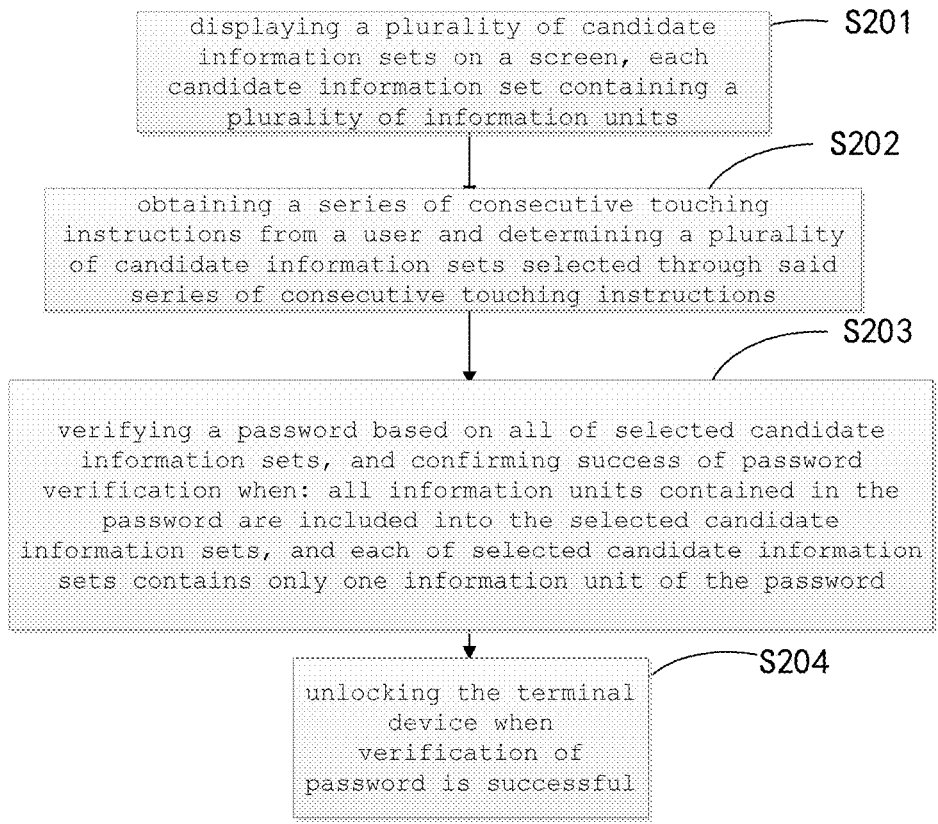
FIG. 5 shows a flow chart of a terminal device password unlocking method according to an embodiment of the invention.

FIG. 5 shows a flow chart of a terminal device password unlocking method according to an embodiment of the invention.

A terminal device password unlocking method to be performed on said terminal device includes a step S201 of displaying a plurality of candidate information sets on a screen, each candidate information set containing a plurality of information units.

A plurality of candidate information sets to be selected is displayed in advance on the screen of the terminal device. Each candidate information set contains a plurality of information units. Single candidate information set can contain a larger or smaller number of information units than the information units contained in the password. Accordingly, candidate information set can contain some information units of the password or contain no information units of the password. However, all the information units of the password should be contained in a collection of all information units of the all candidate information sets so that the terminal device can be unlocked when correct candidate information sets are selected. If not all of the information units of the password is contained in a collection of all information units of the all candidate information sets, the terminal device will not be able to be unlocked no matter which candidate information set is selected.

The method also includes a step S202 of obtaining a series of consecutive touching instructions from a user and determining a plurality of candidate information sets selected through said series of consecutive touching instructions;

The series of consecutive touching instructions are generated through continuous stroke operation of the user on the touch screen.

Each candidate information set has a predefined display region stroke operation of the user on which can cause selection of the corresponding candidate information set. As such, the candidate information set will be selected when the continuous stroke operation occurs to the predefined display region. The user can select one or more candidate information sets. Accordingly, the selected candidate information sets may be part of all of the candidate information sets on the screen.

The method also includes a step S203 of verifying a password based on all of selected candidate information sets, and confirming success of password verification when: all information units contained in the password are included into the selected candidate information sets, and each of selected candidate information sets contains only one information unit of the password.

After the candidate information sets are selected, they are verified to know whether meet the following requirements: all information units contained in the password are included into the selected candidate information sets, and each of selected candidate information sets contains only one information unit of the password. If yes, then it is confirmed that password verification is successful.

In an embodiment, there are 4 candidate information sets on the screen. They are candidate information sets A (1,3,6), B (2,6,7), C (8,6,0), and D (9,3,2), and the password is 1578. The user selects the candidate information sets A, B, C, and D all of which contain 1, 7, 8, and 9 of the password respectively. In addition, all of the candidate information sets A, B, C and D each contain only one information unit of the password. As a result, this time password verification is successful.

The method also includes a step S204 of unlocking the terminal device when verification of password is successful.

When verification of password is successful, the terminal device will be unlocked and when verification fails, the terminal device will maintain its locked status.

Figure 6:
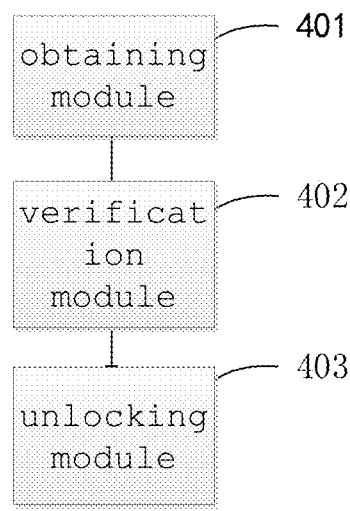
FIG. 6 shows a structural view of a terminal device password unlocking device according to an embodiment of the invention.

FIG. 6 shows a structural view of a terminal device password unlocking device according to an embodiment of the invention.

As shown in FIG. 6, the terminal device password unlocking device includes an obtaining module 401 for selecting at least one candidate information set from a plurality of candidate information sets which are displayed on a screen and each of which contains a plurality of information units; a verification module 402 for verifying a password based on all of selected candidate information sets, and confirming success of password verification when: all information units contained in the password are included into the selected candidate information sets, each of selected candidate information sets contains at least one information unit of the password, and the number of the selected candidate information sets is less than that of the information units of the password; and a unlocking module 403 for unlocking the terminal device when verification of password is successful.

In an embodiment, the obtaining module 401 is for selecting at least one candidate information set from a plurality of candidate information sets which are displayed on the screen and obtaining selection sequence of the candidate information sets. Correspondingly, the verification module 402 is for when verifying a password based on all of selected candidate information sets, success of password verification is confirmed in case that: each of selected candidate information sets contains at least one information unit of the password, the number of the selected candidate information sets is less than that of the information units of the password, and the information units contained in the selected candidate information sets are identical to corresponding information units of the password.

In an embodiment, all the information units of the candidate information set are displayed on the screen in a stationary manner.

In an embodiment, some information units of at least one candidate information set are displayed on the screen in a moving manner.

Furthermore, only part of information units of the candidate information set are displayed in a predefined time, and all the information units of the candidate information set are repeatedly displayed.

Furthermore, all the information units are displayed on the screen in a rotational manner around a center predefined in the screen.

Furthermore, all the information units are displayed in the screen in a random moving manner.

Furthermore, all the information units contained in a specific candidate information set are fixedly displayed when the candidate information set is selected.

In an embodiment, all the information units of each candidate information set are limited to be displayed in a special display region of the screen.

Furthermore, the special display region is a circle, polygon or arc-shaped.

Furthermore, the special displaying regions related to corresponding candidate information sets are distributed in a plurality of concentric circles, a circle, an array, or distributed in parallel manner.

In an embodiment, the candidate information sets are selected based on selection instructions of the user, and an instruction input source corresponding to the selection instructions, is provided by any one or more of the following components: microphone, gyro, physical button, touch screen, camera head, infra-red sensor and vibration sensor.

Furthermore, the selection instructions are triggered by touching the candidate information sets on a touch screen by the user. Furthermore, said touching including sliding, tapping or pressing.

Furthermore, the selection instructions are triggered by mapping a keyword of a voice message input by the user to corresponding candidate information set.

In an embodiment, the information units are any one or combination of the following information elements: character, color, font, font size, pattern or image.

In an embodiment, each of said information units contains two or more said information elements.

Furthermore, each information unit is a character with color; and the character is displayed in said color in a displaying interface.

In an embodiment, the number of information units contained in some candidate information sets is different from that of other candidate information sets. Alternatively, the number of information unit contained in one candidate information set is different from that of the rest of candidate information sets.

In an embodiment, a setting module is further included for randomly arranging the information units of each candidate information set.

Furthermore, the setting module is for randomly setting the number of the information units of the candidate information set.

Figure 7:
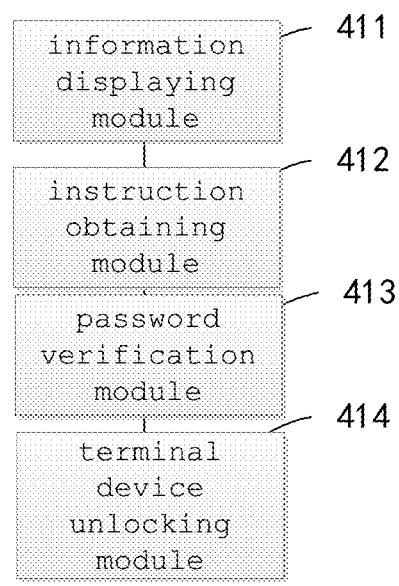
FIG. 7 shows a structural view of a terminal device password unlocking device according to an embodiment of the invention.

FIG. 7 shows a structural view of a terminal device password unlocking device according to an embodiment of the invention.

The current invention provides a terminal device password unlocking device. As shown in FIG. 7, the terminal device password unlocking device includes an information displaying module 411 for displaying a plurality of candidate information sets on a screen, said each candidate information set containing a plurality of information units; an instruction obtaining module 412 for obtaining a series of consecutive touching instructions from a user, and determining a plurality of candidate information sets selected through said series of consecutive touching instructions; a password verification module 413 for verifying a password based on all of selected candidate information sets, and confirming success of password verification when: all information units contained in the password are included into the selected candidate information sets, and each of selected candidate information sets contains only one information unit of the password; and a terminal device unlocking module 414 for unlocking the terminal device when verification of password is successful.

Figure 8:
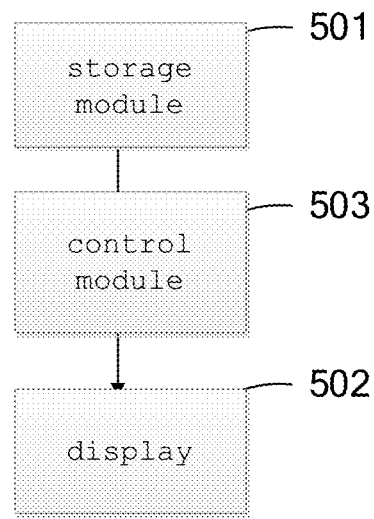
FIG. 8 shows a structural view of a terminal device according to an embodiment of the invention.

FIG. 8 shows a structural view of a terminal device according to an embodiment of the invention.

As shown in FIG. 8, the terminal device includes a storage module 501, a display 502 and a control module 503. The storage module 501 is for storing program and relevant data for performing the terminal device password unlocking method as described above, such as arrangement of the candidate information sets, information units of the set, and information elements of the information unit. The control module 503 is for performing the terminal device password unlocking method as described above. The display 502 is for providing a display interface for displaying candidate information sets and corresponding information units.

The terminal device of the various embodiments of the invention may be a cellphone, tablet PC, notebook or electronic lock. When the above terminal device password unlocking method is carried out by the terminal device, it can be used to unlock electronic locks, identification authentication, password verification when logging on software, and locked device.

To select the candidate information sets by the user, the display 502 may be a touch screen. The terminal device may also include any one or more of the following components: microphone, gyro, physical button, camera head, infra-red sensor and vibration sensor.

Those skilled in the art will appreciate that the present invention includes apparatus that is directed to performing one or more of the operations described herein. These devices may be specially designed and manufactured for the required purposes, or may also include known devices in a general purpose computer. These devices have computer programs stored therein that are selectively activated or reconfigured. Such computer programs may be stored in a device (for example, computer) readable medium or in any type of medium suitable for storing electronic instructions and respectively coupled to a bus, including but not limited to any Types of disks (including floppy disks, hard disks, optical disks, CD-ROMs, and magneto-optical disks), ROM (Read-Only Memory), RAM (Random Access Memory), EPROM (Erasable Programmable Read-Only Memory), EEPROM (Electrically Erasable Programmable Read-Only Memory), flash memory, magnetic card or light card. That is, a readable medium includes any medium that is stored or transmitted by a device (for example, a computer) in a readable form.

Those skilled in the art will appreciate that each block of the block diagrams and/or block diagrams and/or flow diagrams and combinations of blocks in the block diagrams and/or block diagrams and/or flow diagrams can be implemented by computer program instructions. Those skilled in the art will appreciate that these computer program instructions can be implemented by a general purpose computer, a professional computer, or a processor of other programmable data processing methods, such that the processor is executed by a computer or other programmable data processing method.

Those skilled in the art can understand that the various operations, methods, and steps, measures, and solutions in the present invention may be alternated, modified, combined, or deleted. Further, other steps, measures, and schemes of the various operations, methods, and processes that have been discussed in the present invention may be alternated, modified, rearranged, decomposed, combined, or deleted. Further, the steps, measures, and solutions in the various operations, methods, and processes disclosed in the present invention may be alternated, changed, rearranged, decomposed, combined, or deleted.

Though various embodiments of the invention have been illustrated above, a person of ordinary skill in the art will understand that, variations and improvements made upon the illustrative embodiments fall within the scope of the invention, and the scope of the invention is only limited by the accompanying claims and their equivalents.

The invention claimed is:

1. A terminal device password unlocking method comprising the following steps:
    selecting by a user at least one candidate information set from a plurality of candidate information sets which are displayed on a screen and each of which contains a plurality of information units;
    verifying a password based on all of the user selected candidate information sets, and confirming success of password verification when: all information units contained in the password are included into the user selected candidate information sets, each of the user selected candidate information sets contains at least one information unit of the password, and the number of the selected candidate information sets by the user is less than that of the information units of the password; and
    unlocking the terminal device when verification of password is successful.

2. The method as recited in claim 1, wherein the step of selecting by the user at least one candidate information set from a plurality of candidate information sets which are displayed on the screen includes selecting at least one candidate information set from a plurality of candidate information sets which are displayed on the screen and obtaining selection sequence of the candidate information sets; and
    when verifying a password based on all of selected candidate information sets, success of password verification is confirmed in case that: each of selected candidate information sets contains at least one information unit of the password, the number of the selected candidate information sets is less than that of the information units of the password, and the information units contained in the selected candidate information sets are identical to corresponding information units of the password.

3. The method as recited in claim 1, wherein all the information units of the candidate information set are displayed on the screen in a stationary manner.

4. The method as recited in claim 1, wherein some information units of at least one candidate information set are displayed on the screen in a moving manner.

5. The method as recited in claim 4, wherein only part of information units of the candidate information set is displayed in a predefined time, and all the information units of the candidate information set are repeatedly displayed.

6. The method as recited in claim 4, wherein all the information units are displayed on the screen in a rotational manner around a center predefined in the screen.

* * * * *